UNITED STATES PATENT OFFICE.

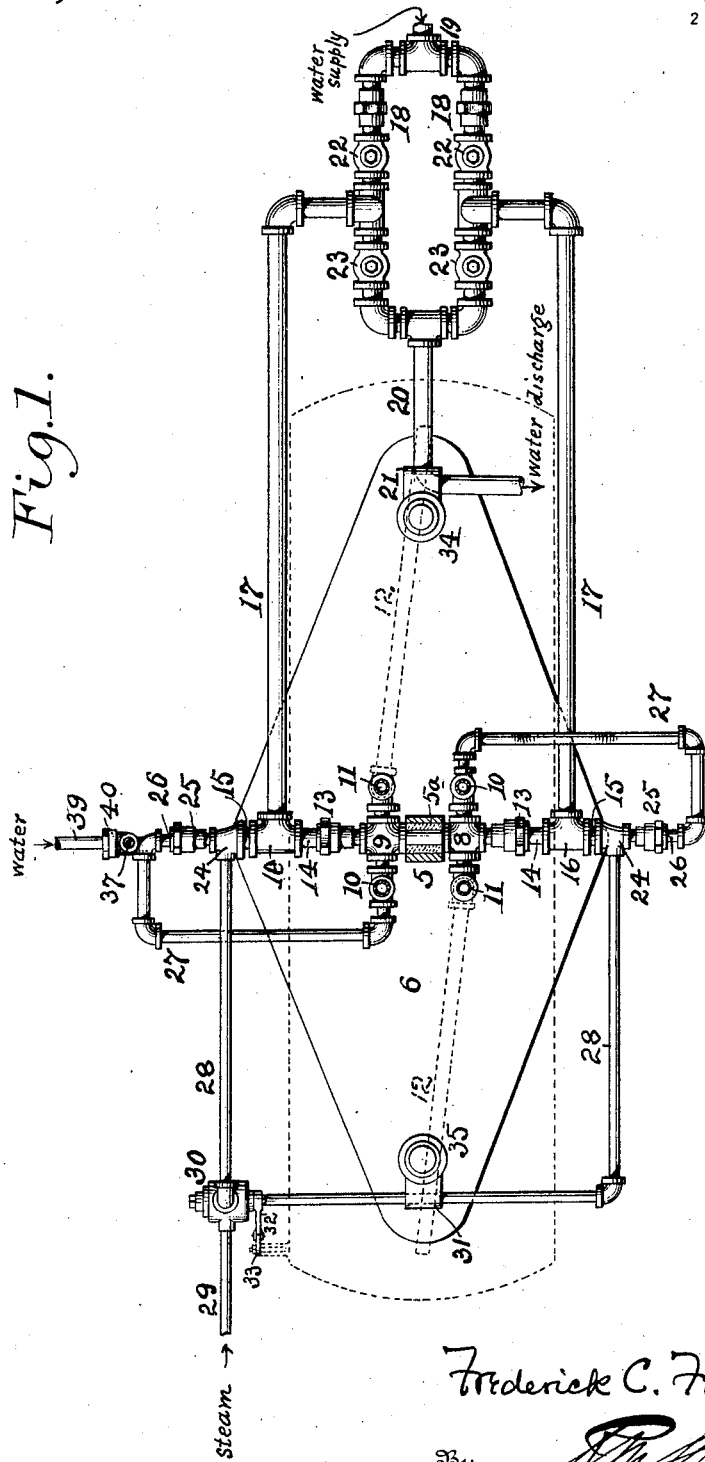

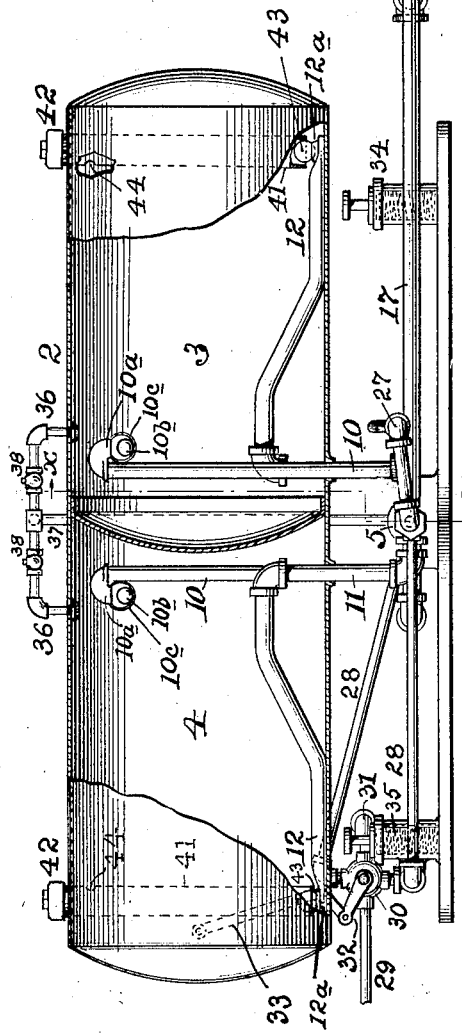
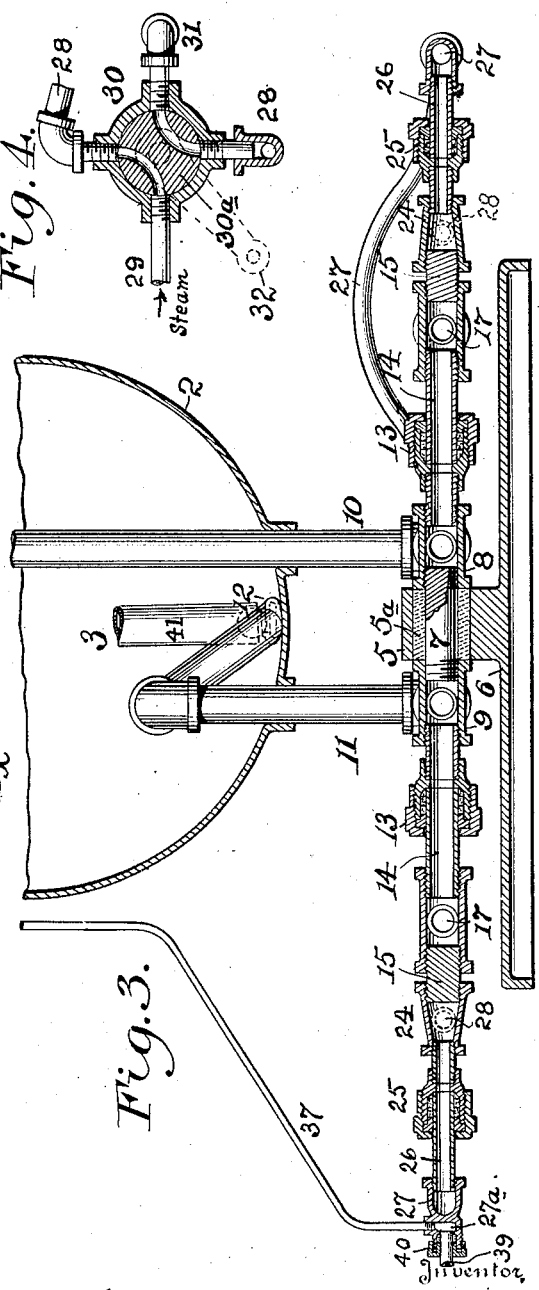

FREDERICK C. FARNSWORTH, OF CONSHOHOCKEN, PENNSYLVANIA.

DUPLEX PUMPING-TRAP.

1,392,924.  Specification of Letters Patent.  Patented Oct. 11, 1921.

Application filed September 30, 1918. Serial No. 256,168.

*To all whom it may concern:*

Be it known that I, FREDERICK C. FARNSWORTH, a citizen of the United States, and resident of Conshohocken, county of Montgomery, and State of Pennsylvania, have invented an Improvement in Duplex Pumping-Traps, of which the following is a specification.

The object of my invention is to provide a duplex tilting trap of simple construction which will automatically handle water from any source and deliver it into a boiler or other place of discharge.

My invention relates to that type of trap heretofore known, in which a tank is pivoted to oscillate and by the said action operate suitable valves to admit water and steam alternately, the admission and discharge of the water causing said oscillations.

My invention consists of certain improvements applied to tilting trap of the above type, whereby a duplex action may be had so that it is practically continuous in operation where a sufficient water supply is available.

My invention also consists of other improvements hereinafter described whereby the above and other objects and results are attained, said improvements comprising certain organization and combination of parts which are fully described hereinafter and more particularly defined in the claims.

Referring to the drawings: Figure 1 is a plan view of the general pipes and valves of my improved trap, the tank being removed; Fig. 2 is a side elevation of my improved trap with a portion of the tank broken away to show the interior; Fig. 3 is a cross section of the same on line $x$—$x$; and Fig. 4 is a sectional view through the valve mechanism.

2 is a tilting tank, divided internally into two water compartments 3 and 4. This tank is provided with a transverse journal 7 which is supported in the bearing 5 extending up from the bed plate 6 and provided with a detachable retaining cap. In this manner the tank may oscillate upon the bearing. 34 and 35 are spring bumpers or dash pots, arranged one under each end of the tank to limit its oscillation.

At opposite ends of the solid journal 7, are pipe fittings 8 and 9 from which upwardly extend the water pipes 11 and steam pipes 10, said pipes secured to the tank 2 by welding or otherwise and opening into the compartments as shown, said pipes having no direct communication outside of the tank. Each of the compartments 3 and 4 are provided with pipes 10 and 11, the pipe 11 opening close to the bottom of the compartment, whereas the pipe 10 discharges near the top of the compartment. If desired, the water may pass into and out of the compartment through an extension 12 of pipe 11 to the outer end of the compartment. The inlet and outlet orifice $12^a$ for the water may be controlled with a float valve piece 43 so that when the water is driven out by the steam from pipe 10, the valve will prevent steam following should it attempt to do so. As shown, this float valve 43 is guided in a vertical tube 41 extending down through and from the top of the tank body and having a screw cap 42 at its top for insertion or removal of the float valve. The upper end of the tube in the compartment is provided with an aperture 44 to prevent air binding.

The steam pipe 10 is preferably provided at its upper end with an automatic valve $10^b$ which may be in a wire cage $10^c$ and seating upwardly against the downwardly directed valve seat $10^a$ of pipe 10 to seal said pipe if the water attempts to overflow into it from the compartment. Each of the compartments 3 and 4 are provided with the pipes 10 and 11 and also with the above described valves $10^b$ and 43. The valve $10^b$ may be like an ordinary check valve if it is not desired to vent the tank through valve 30.

The pipes 11 of both compartments 3 and 4 open, through the respective fittings 8 and 9, into the stuffing box swing joints 13, from which extend stationary pipe sections 14 in communication with fittings 16 and water pipes 17, said pipes in receiving water from main 19 through branch pipes 18 and check valves 22. These pipes 17 also communicate with the discharge pipe 20 through branch pipes $20^a$ having check valves 23. In this way the water passes from supply pipe 19 to either pipe 17 and to one compartment 3 or 4, while the water is discharging from the other compartment through its pipe 17 and discharge pipe 20, this action reversing with each oscillation of the tank 2. The discharge pipe 20 may be secured to a steadying hub 21 on the bed plate, if so desired.

It is to be understood that the stuffing box swing joints 13 and pipe connections are in alinement with the journal 7 so that during oscillation thereof they will move as a unit and without binding.

At the outer end of the two fittings 16 are plugs 15 and these carry outer fittings 24 which are respectively connected through the pipes 28 with a valve 30, and thence with a steam supply pipe 29. The valve 30 is operated to supply steam from supply pipe 29 to each of the pipes 28 alternately with the successive oscillations of the tank 2; when it oscillates in one direction steam is supplied to one pipe 28 and thence to compartment 3, and when it oscillates in the other direction the steam is supplied to the other compartment 4. This valve 30 also acts to vent the pipes 28 and compartments 3 and 4 into the atmosphere, through a pipe 31 if valves 10$^b$ are not employed and the steam is not condensed as hereinafter provided for. The valve structure 30 may be as shown in Fig. 4, in which the plug 30$^a$ has ports and may be oscillated by a lever 32 connected by a link 33 with the tank 2 (Fig. 2). The pipes 10 of the two compartments 3 and 4 are respectively connected by pipes 27 with pipes 26 which work in the stuffing box swing joints 25 directly connected with the respective stationary fittings 24 (Fig. 3).

It will be seen that all of the piping for supplying the water and steam (Fig. 1) are stationary, whereas the pipes 10 and 11 and those connecting with them oscillate with the tank, and this is made possible by having the two sets of stuffing box swing joints 13 and 25, all in alinement with the journal 7 and its bearing.

It will be understood, that in operation the two compartments 3 and 4 are alternately filled with water and similarly the water is alternately forced out of the compartments by alternate admission of steam under pressure, the steam being controlled directly by valve 30 and indirectly by the oscillations of the tank 2. The operations in each compartment 3 and 4 are precisely the same, but when one compartment is filling with water the other is discharging, so that the operation of forcing the water through pipe 20 is almost continuous, where the supply is sufficient. In using this trap on a boiler, it is set at an elevation to cause the water leaving the trap to have a sufficient static head to force its way into the boiler, when the boiler pressure steam is supplied to the trap. In other uses it is merely a matter of steam pressure, as to where the discharge water may be delivered.

As the movements of the water in passing in and out of the trap may be different in point of time under some conditions of working, I have provided the valves 43 and 10$^b$ for following purposes. If steam is being admitted to compartment 3 and water blown out before water supply in compartment 4 is sufficient to tilt the tank, valve 43 will close outlet to pipe 11 and 12 and prevent escape of steam. If, on the other hand, the discharge of the water from compartment 3 was slow and tank 4 filled up, valve 10$^b$ prevents overflow of water into the steam pipe 10 and thereby avoids a condition which would derange the working of the trap for a period or until the water could be blown out. By means of these valves 43 and 10$^b$ the oscillation of the tank must take place under proper conditions and no derangement of the apparatus can occur due to outside causes.

Where the water is freely supplied to the trap by pipe 19, the apparatus as above described is amply sufficient; but in those cases where the water must be lifted or sucked into the trap, as in steam heating systems where condensation is to be delivered into the boiler, I provide additional means for condensation of the steam in the trap to create a partial vacuum to assist in causing the water to flow into the trap. This means I provide in a branching pipe 36, the ends opening respectively into spray nozzles in each of the compartments 3 and 4. These branch pipes 36 receive water supply from a pipe 37 and have check valves 38 which permit passage of spray water but prevent escape of steam. The pipe 37 oscillates with the tank 2 and is connected in a chamber 27$^a$ of the elbow fitting 27 before described. This chamber is part of a small stuffing box swing joint 40 having the fixed water supply pipe 39 (Fig. 3), which parts are also in alinement with the other swing joints 13 and 25 and journal 7. In operation, this means works as follows: When steam has been admitted to either compartment 3 and 4 and the water forced out and steam supply cut off by valve 30, the water from spray nozzle of the pipe 36 will enter and condense the steam left in the compartment and thereby produce a vacuum sufficient to materially assist in sucking water into the chamber to again fill it. It will be understood that the water pressure in pipe 39 must be sufficient to force in the water when the steam pressure is cut off by valve 30. The use of such a vacuum producing means increases the efficiency of the apparatus under conditions of low pressure of water supply or where gravity would prevent an adequate supply.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A tilting trap comprising a hollow body member pivoted upon a base to oscillate thereon about a transverse axis and having an automatic means for supplying water and steam to the body alternately under control of the oscillations thereof, characterized by having the hollow body in the form of a long tubular cylinder divided transversely at its middle to form two independent abutting compartments end to end and upon opposite sides of the transverse pivotal support and also having separate sets of pipes for steam and water to each compartment in rigid relation with each other and to the body and moving with the body, said steam and water pipes having independent terminals in alinement with the transverse axis of oscillation of the hollow body member, stationary water supply and discharge pipes having valves therein to permit water flowing freely to and from each of the compartments and in which the terminals thereof for supplying each of the compartments have an opening also in alinement with the pipe terminals on and moving with the body, swing joint connections between the said openings from the two sets of stationary water supply and discharge pipes and the respective water pipe terminals of the two compartments of the body, stationary pipes for supplying steam to the respective steam pipe terminals of the body also in alinement with the axis of oscillation thereof, swing joints between the steam terminals of the body and the respective stationary steam pipes for maintaining continuous open communication while permitting oscillation of the body, and valve devices mechanically operated by the oscillating body for controlling the supply of steam to and venting the air to the atmosphere from the two compartments alternately, whereby one of the compartments is filling with water and discharging the air into the atmosphere while the other compartment is filling with steam and discharging its water content, and vice versa.

2. A tilting trap comprising two compartments respectively on opposite sides of a pivot support and each compartment provided with pipes for admitting steam to the upper portion and water to and from the lower portion thereof, and automatic valve devices for controlling the admission of steam to the two compartments alternately, when characterized by having the water outlet pipes of each of the chambers provided with valves which automatically close the outlets when the water content of the chambers has been discharged, said valves so constructed that while the water may freely flow into and out of the chambers the steam cannot follow the water after it leaves the chambers.

3. The invention specified in claim 2 when further characterized by having the valves of the water outlets from the chambers made in the form of float valves adapted to rise and fall with the water, and combined with guiding means to insure the float valves properly seating when the water content has been discharged.

4. The invention specified under claim 3 when the guiding means for the float valves comprise tubes extending through the top portions of the body and down to near the water outlet at the bottom interior of the body, said tubes having water-tight caps upon their tops to provide access to the float valves and also having vent apertures through their walls near the top of the interior of the chambers to permit the water to rise and fall within the tubes.

5. A tilting trap comprising two compartments respectively on opposite sides of a pivot support and each compartment provided with pipes for admitting steam to the upper portion and water to and from the lower portion thereof, and automatic valve devices for controlling the admission of the steam to the two compartments alternately, when characterized by having a cold water spray pipe opening into each of the compartments, and check valves in said pipes to prevent flow of water spray into the respective compartments when steam pressure is supplied thereto, but to automatically admit spray water to condense the steam in the respective compartments when the steam supply to either compartment is shut off.

6. A tilting trap comprising two compartments respectively on opposite sides of a pivot support and each compartment provided with pipes for admitting steam to the upper portion and water to and from the lower portion thereof, and automatic valve devices for controlling the admission of the steam to the two compartments alternately, when characterized by having the inlets of the steam supply pipes within the chambers arranged near the upper parts of the chambers and each provided with an automatic valve which will admit steam but prevent water within the chambers passing into the steam pipes.

7. A tilting trap comprising two compartments respectively on opposite sides of a pivot support and each compartment provided with pipes for steam and water and movable with the compartments, fixed water supply and discharge pipes independent of the tilting compartments, fixed steam supply pipes independent of the tilting compartments, and valve devices to supply steam to the two compartments alternately, characterized by having the stationary water and steam pipes on the one hand and the movable water and steam pipes on the pivoted compartments on the other hand, connected by four tubular swing joints arranged in the same axial alinement with the pivot of the oscillating tank.

8. The invention according to claim 7, further characterized by having a cold water spray pipe opening into the upper part of each of the compartments, means to supply cold water to said spray pipes, and valve devices for controlling the supply of cold water to said spray pipes alternately, whereby cold water spray is supplied into one compartment while steam is being supplied to the other compartment, and vice versa.

9. The invention according to claim 8, further provided with a fifth tubular swing joint for supplying water from a stationary water supply pipe to the spray pipes moving with the tilting compartments.

10. A tilting trap comprising two compartments respectively on opposite sides of a pivot support and each compartment provided with pipes for admitting steam to the upper portion and water to and from the lower portion thereof, and automatic valve devices for controlling the admission of steam to the two compartments alternately, characterized by having a cold water spray pipe opening into each of the compartments, and valve devices for controlling the supply of cold water spray to the two spray pipes alternately, whereby cold water spray is supplied into one compartment while steam is being supplied to the other compartment, and vice versa.

11. In a tilting trap, the combination with the bed plate and tilting body, having downwardly extending passages from the interior of the body and terminating at their lower ends in a non-tubular transverse journal portion immediately beneath the body providing an axis of oscillation therefor, said downwardly extending passages respectively having oppositely directed unobstructed tubular portions in alinement with the non-tubular transverse journal portion, a bearing extending upward from the bed plate and in which the transverse journal is seated and upon which the tilting body oscillates, and stationary pipes communicating with the oppositely directed tubular portions through adjustable connections for supplying and discharging water and steam as may be required.

12. The invention according to claim 11, wherein the adjustable connections comprise stuffing box swing joints.

13. The invention according to claim 11, wherein the non-tubular transverse journal portions provide flanges at each end of the journal whereby they act as shoulders to prevent the journal shifting end-wise in the bearing.

14. The invention according to claim 11, wherein the journal is provided at each end with shoulders to prevent it shifting longitudinally in the bearing, and the bearing further provided with a retaining cap extending over the journal.

15. In a tilting trap, the combination of a bed plate having a bearing, a tilting tank body arranged above the bearing and divided into two compartments by a division plate, said tank having downwardly extending tubular passage portions and a transverse non-tubular journal between them and journaled in the bearing and upon which the tank oscillates, pipe connections for supplying water and steam alternately to one of the compartments and for discharging the water therefrom, and a medium for the other compartment acting to counterbalance the tank and cause it to oscillate upon discharging the water from the first mentioned compartment.

In testimony of which invention, I hereunto set my hand.

F. C. FARNSWORTH.